T. P. HOLMES & J. F. ELDRIDGE.
Harness-Saddle.
No. 209,123.                    Patented Oct. 22, 1878.
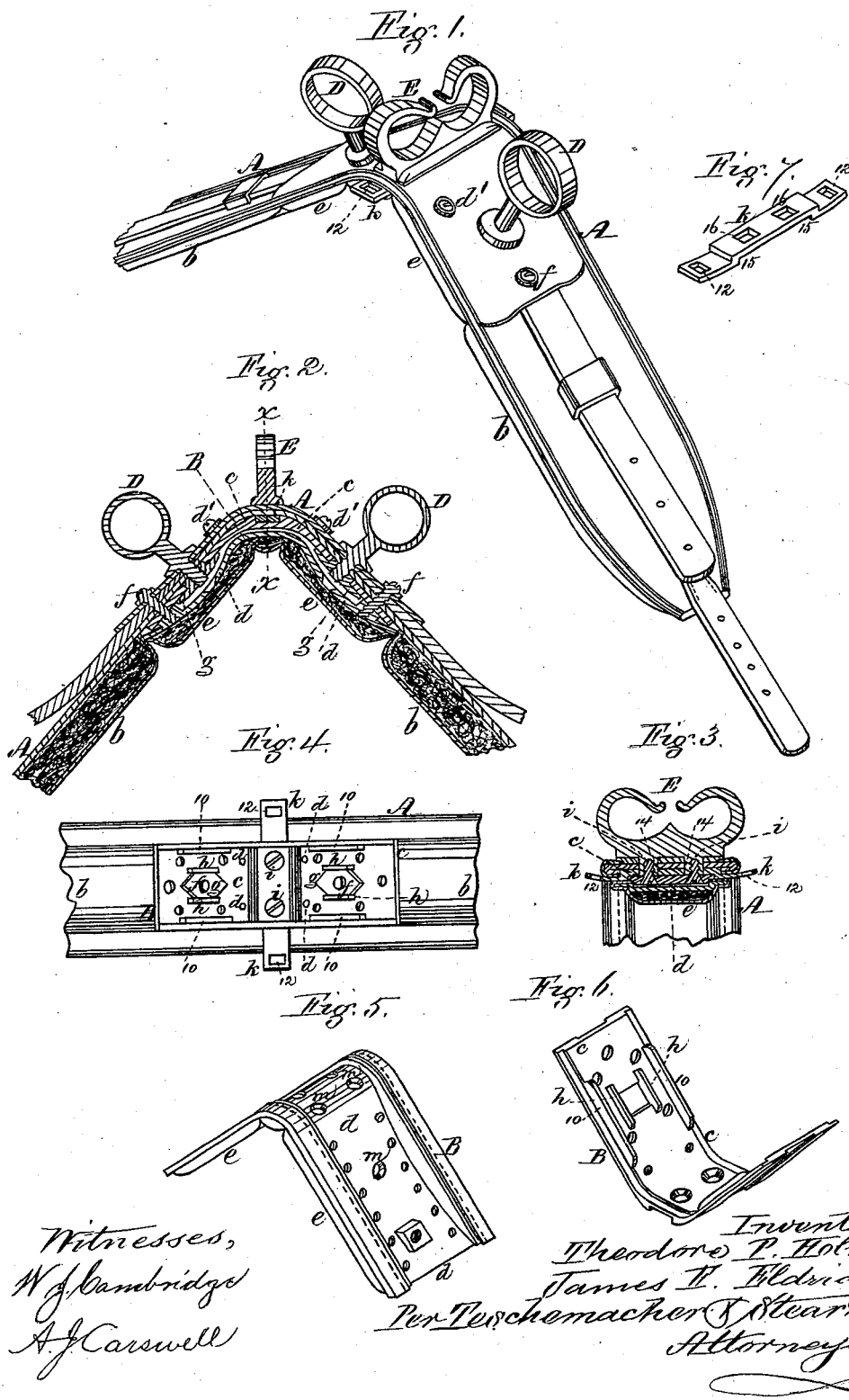

UNITED STATES PATENT OFFICE.

THEODORE P. HOLMES AND JAMES F. ELDRIDGE, OF MIDDLEBOROUGH, MASSACHUSETTS.

IMPROVEMENT IN HARNESS-SADDLES.

Specification forming part of Letters Patent No. 209,123, dated October 22, 1878; application filed April 26, 1878.

*To all whom it may concern:*

Be it known that we, THEODORE P. HOLMES and JAMES F. ELDRIDGE, of Middleborough, in the county of Plymouth and State of Massachusetts, have invented certain Improvements in Harness-Saddles, of which the following is a full, clear, and exact description, reference being had to the accompanying drawings, making part of this specification, in which—

Figure 1 is a perspective view of a harness-saddle constructed in accordance with our invention. Fig. 2 is a longitudinal section through the same. Fig. 3 is a transverse section through the same on the line $x\ x$ of Fig. 2. Fig. 4 is a plan of the under side of the same, the lower or detachable portion of the metallic saddle-tree being removed to expose the fastenings of the water-hook and terrets. Fig. 5 is a perspective view of the padded detachable portion of the saddle-tree. Fig. 6 is a view of the upper portion or plate of the saddle-tree inverted. Fig. 7 is a detail.

Our invention consists in the combination, with a harness-saddle, of a metallic tree formed of two plates or portions adapted to fit snugly together without the interposition of any intermediate substance, the upper portion of the tree being securely attached to the saddle, and having ribs on its under side to hold the terret-nuts, while the lower portion of the tree, which is padded, is made detachable from the upper portion, and is secured thereto by screws, which construction admits of the padded portion being readily removed in order to expose the fastenings of the water-hook and terrets, which can thus be easily removed or tightened up, while the operation of renewing or repairing the padding at the central portion of the saddle is also greatly facilitated.

Our invention also consists in a harness-saddle having a double water-hook, and provided on each side with a hitching-loop for the crupper or back-strap, which construction admits of the saddle being frequently reversed for the purpose of keeping the stuffing of the pads as nearly as possible in its original position, and thus preventing the chafing of the horse's back, which is liable to be caused by the tipping back of the saddle, produced by the working of the stuffing over toward its front side when used in one position only, as heretofore.

To enable others skilled in the art to understand and use our invention, we will proceed to describe the manner in which we have carried it out.

In the said drawings, A represents a harness-saddle, the sides of the interior of which are padded at $b\ b$. B is the metallic saddle-tree, which is applied to the under side of the saddle A at the center or apex. This tree is composed of two portions or plates, $c\ d$, adapted to fit together, the upper one, $c$, being firmly secured to the under side of the saddle by means of four screws, $d'$, the heads of which project up above its outer surface.

The lower plate, $d$, of the tree is padded on its under side at $e$, suitable holes for the stitching and quilting being provided, and is secured to the plate $c$ by screws $f$, passing down from the outside of the saddle through both plates of the tree, the plate $d$ being recessed to receive the projecting ribs 10 on the plate $c$ when the two are fitted together.

D D are the terrets, the screw-shanks of which pass through apertures in the plate $c$, and are held firmly in place by nuts $g$, which fit between ribs $h$ cast on the under side of the plate, these ribs preventing the turning of the nuts and the consequent loosening of the terrets.

E is the water-hook, which is made double, or with two hooked portions facing in opposite directions, to admit of the saddle being reversed for a purpose to be hereinafter described. This water-hook is secured in place by two screws, $i$, passing up through the plate $c$ into square projections 14 on the under side of the water-hook, the heads of the screws being countersunk in the under surface of the plate $c$, and between the upper surface of this plate $c$ and the leather above it is introduced a narrow metallic plate, $k$, the ends of which project beyond the edge of the saddle, and are each provided with a slot or loop, 12, one or the other of these slots being used (in accordance with the position of the saddle) to receive the end of the strap which extends along the back of the horse from the crupper.

The plate $k$ is provided with shoulders 15, which fit over the edge of the plate $c$ and prevent the plate $k$ from being moved in the direction of its length, and this plate $k$ is secured firmly in place by the projections 14 on the under side of the water-hook, which pass through apertures 16, Fig. 7, therein.

From the foregoing it will be seen that if the saddle should require repairs by reason of the water-hook or terrets becoming loose or broken, it is simply necessary to take out the screws $f$ and remove the lower plate, $d$, to expose and obtain access to the several fastenings, when the water-hook, terrets, &c., can be readily tightened up or removed and replaced by new ones, and the inner plate, $c$, can also be easily removed, if broken, and replaced by another, no ripping of stitches or tearing open of the saddle, as heretofore, being required, and consequently repairs are greatly facilitated and their cost materially reduced, as skilled labor is not required.

Another great advantage resulting from our improved construction is the facility with which the stuffing or padding on the under side of the plate $d$ can be increased or diminished in thickness or altered in form to comfortably fit the backs of different horses, or renewed if it becomes soiled, worn, or otherwise injured, without cutting or otherwise disturbing any other portion of the saddle, the cost of new stuffing being very slight; and if the padding $e$ should be worn away, no nuts or other fastenings or protuberances are exposed, as in an ordinary saddle, and consequently the liability of injury to the back of the horse from this cause is entirely avoided.

The detachable plate $d$ of the saddle-tree is provided with apertures $m$ for the admission of air to the stuffing or padding, the drying of which, when wet, is thereby facilitated, and this drying operation can be still further accelerated by removing the plate $d$ and placing it in the sun or other warm place.

By providing the saddle with a double water-hook, E, having two hooked portions facing in opposite directions, and having a hitching-loop, 12, on each side, the position of the saddle can be reversed as often as desired, it being merely necessary to unfasten the back-strap from the loop 12 on one side of the saddle and connect it with the loop 12 on the other side, and by thus frequently reversing the position of the saddle on the horse the padding or stuffing can be always kept in its proper central position and prevented from working toward the front side, as heretofore, this working of the stuffing toward the front being objectionable, as it causes the saddle to be canted up in front, which brings the rear edge into contact with the horse's back and chafes or injures him.

Another advantage of the double water-hook is that if one portion should break when on the road it is simply necessary to reverse the saddle and utilize the other portion of the hook.

What we claim as our invention, and desire to secure by Letters Patent, is—

1. The combination, with a harness-saddle, of a metallic tree, B, formed of two plates or portions, $c$ $d$, adapted to fit snugly together without the interposition of any intermediate substance, the upper one, $c$, being securely attached to the saddle, and having ribs $h$ on its under side to hold the terret-nuts $g$, and the lower or padded portion, $d$, being made detachable from the upper portion, $c$, and secured thereto by screws $f$, all constructed and arranged to operate substantially in the manner and for the purpose described.

2. A harness-saddle provided with a double water-hook, E, and having a hitching-loop, 12, on each side to allow of the reversal of the saddle, substantially as and for the purpose set forth.

Witness our hands this 4th day of April, A. D. 1878.

THEODORE P. HOLMES.
JAMES F. ELDRIDGE.

In presence of—
WILLIAM F. THOMPSON,
ALBERT W. ELLIOTT.